United States Patent [19]

Bradshaw et al.

[11] Patent Number: 4,480,485
[45] Date of Patent: Nov. 6, 1984

[54] ACOUSTIC FLOWMETER WITH ENVELOPE MIDPOINT TRACKING

[75] Inventors: James E. Bradshaw, Tyngsboro; Norman E. Pedersen, Newburyport, both of Mass.

[73] Assignee: Panametrics, Inc., Waltham, Mass.

[21] Appl. No.: 432,353

[22] Filed: Oct. 1, 1982

[51] Int. Cl.³ .............................................. G01F 1/66
[52] U.S. Cl. ................................................. 73/861.28
[58] Field of Search ................. 73/861.27, 861.28, 597

[56] References Cited

U.S. PATENT DOCUMENTS

| 3,512,410 | 5/1970 | Vander Heyden | 73/861.05 |
|---|---|---|---|
| 4,011,755 | 3/1977 | Pedersen et al. | 73/194 A |
| 4,079,315 | 3/1978 | Mohr | 73/597 |
| 4,167,879 | 9/1979 | Pedersen | 73/610 |
| 4,183,244 | 1/1980 | Kohno et al. | 73/861.28 |
| 4,271,708 | 6/1981 | Kohno et al. | 73/861.28 |
| 4,300,401 | 11/1981 | Pedersen | 73/861.31 |
| 4,308,754 | 1/1982 | Pedersen et al. | 73/861.28 |

Primary Examiner—Herbert Goldstein
Attorney, Agent, or Firm—Lahive & Cockfield

[57] ABSTRACT

An acoustic burst with a predetermined amplitude envelope is triggered by a square wave signal and transmitted upstream or downstream to a transducer connected to an adaptive control system which tracks the midpoint of the received envelope. The received signal is rectified and fed via a polarity reversing circuit controlled by the square wave to an integrator whose output level controls the frequency of the square wave. The burst transit time is measured to the next zero crossing of the received signal following the half cycle transition point of the square wave.

17 Claims, 3 Drawing Figures

ACOUSTIC FLOWMETER WITH ENVELOPE MIDPOINT TRACKING

BACKGROUND OF THE INVENTION

This invention relates to an acoustic flowmeter and more particularly to such a flowmeter having improved accuracy and reliability.

Various systems have been developed for measuring the velocity of a fluid flow by utilizing the effect the fluid velocity will have on the transit time of acoustic pulses transmitted through the fluid medium along the axis of flow. One such system uses a dual "sing-around" technique in which one series of pulses is transmitted in one direction, e.g. upstream, and another series of pulses is transmitted in the opposite direction, e.g. downstream. The time when each pulse is received determines when the next pulse will be transmitted in the same direction. Accordingly, the repetition rate of the pulses in each direction is predominantly determined by the transit time between spaced transducers in the fluid medium. The transit time, in turn, is proportional to the flow velocity of the fluid medium. Thus, the pulse repetition rate provides an indication of fluid velocity.

Other systems have attempted to measure directly the elapsed time between transmission and reception of acoustic pulses in the form of repetitive triggered bursts of high frequency acoustic energy having a characteristic amplitude envelope. Because the beginning and end of the bursts is low in amplitude, one approach is to detect the peak amplitude of the envelope signal, and to measure time from peak to peak. However, because of the signal to noise ratio of broadband transducers at the relatively low acoustic frequencies employed, e.g. 500 kHz and below, precise peak detection has proven to be difficult. It would be desirable to have a system of measuring the time between transmission and reception of the signal envelope that is more accurate.

Accordingly, it is an object of this invention to provide an acoustic flowmeter that includes accurate, reliable, and inexpensive acoustic pulse transit time measuring system which does not rely on direct peak detection.

SUMMARY OF THE INVENTION

These and other objects of the invention are achieved with two spaced transducers by periodically transmitting a synthesized burst of ultrasound having a predetermined amplitude envelope and employing a feedback loop to track the midpoint of the received envelope. A variable time based generator produces a square wave signal, the leading (rising) edges of which repetitively trigger the waveform generator. The received signal is rectified and fed to an integrator via a polarity inverting circuit controlled by the square wave signal. The frequency of the square wave signal is controlled by the output level of the integrator. If the point at which the square wave signal changes from high to low (half cycle transition point) comes precisely at the midpoint of the received rectified envelope, the envelope will be cleaved into two halves. Thus, during the first half cycle of the square wave signal, the integrator output will change by a given amount in one direction and during the second half cycle of the square wave signal, the integrator output will fall by the same amount and return to the same output level, leaving the square wave signal at the same frequency. On the other hand, if the half cycle transition point occurs before or after the midpoint of the received envelope, the bipolar integrator inputs will be unbalanced and the integrator output will be left at a different level tending to lower or raise the frequency of the square wave signal, respectively. Thus, the output of the integrator produces an error signal which is "nulled" by shifting the half cycle transition point toward the midpoint of the preceding received envelope.

In the preferred embodiment, the half cycle transition point signal enables a zero crossing detector which issues an output signal upon the next zero crossing of the unrectified received signal. The zero crossing detector output thus tends to track the arrival of the midpoint of the bursts. The time interval between the transmission of the burst and the output of the zero crossing detector is preferably measured and averaged over numerous repetitions in one direction relative to the fluid flow and then repeated for the opposite direction.

Typically a number of measurements in the upstream direction are used to determine an average transit time $\overline{T}_{up}$ in that direction. The same number of measurements is then made in the opposite direction to determine an average transit time $\overline{T}_{down}$ for downstream propagation. In order to avoid inclusion of measurement values distorted by signal processing noise or the like, an analysis is carried out to determine the observed standard deviation for each series of measurements. If this observed deviation exceeds a predetermined limit, e.g. 1% to 2%, representing expected variation due to normal turbulence that value of $\overline{T}_{up}$ and $\overline{T}_{down}$ is disregarded. From the $\overline{T}_{up}$ and $\overline{T}_{down}$, the flow can be computed from the following equation:

$$V_{measured} = \frac{PF}{2 \sin \theta} \times \frac{\overline{T}_{up} - \overline{T}_{down}}{[\overline{T}_{up} \times \overline{T}_{down}]}$$

where:
P = path length of the transmitted burst from transmitter to receiver;
F = a Flow Profile Factor; and
$\theta$ = the angle between direction of the transmitted ultrasound beam and a normal to the direction of flow of the stream.

The expression for observed standard deviation is $$S = \left[ \frac{\sum\limits_{i=1}^{n} T_i^2 - \frac{\left[\sum\limits_{i=1}^{n} T_i\right]^2}{n}}{n-1} \right]^{\frac{1}{2}}$$

where
$T_i$ = each individual measurement of T and
n = total number of measurements in the series.

A more precise calculation could be carried out by determining a corresponding flow velocity $V_n$ for each measurement. However, this requires both an upstream and downstream measurement for each determination in the series.

BRIEF DESCRIPTION OF THE DRAWINGS

Other objects, features and advantages of the invention will be apparent from the following description of a preferred embodiment, including the drawings, in which.

DESCRIPTION OF THE PREFERRED EMBODIMENT

Figure 1:
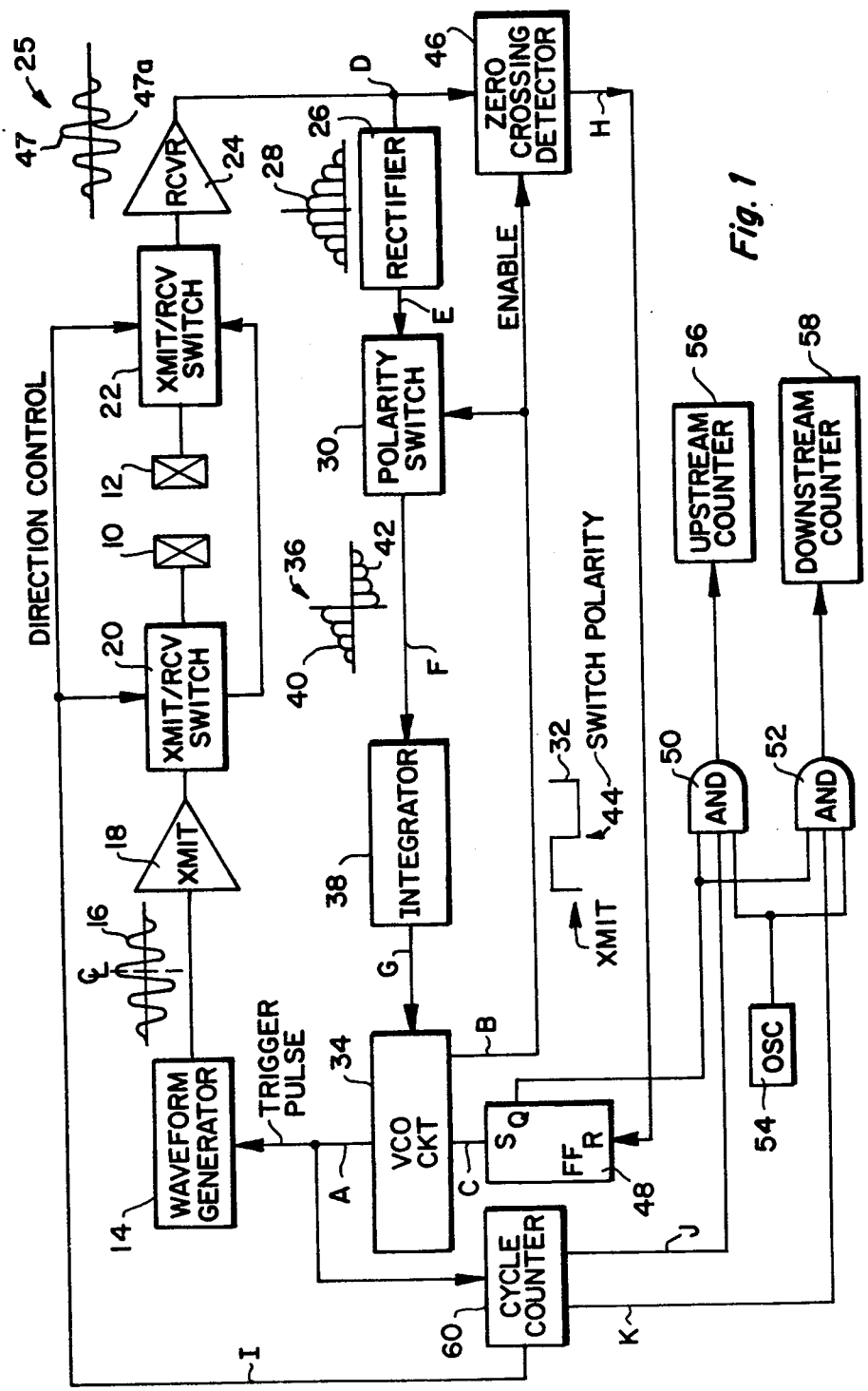
FIG. 1 is a functional block diagram of an acoustic flowmeter system according to the invention.

As shown in FIG. 1, an acoustic flowmeter uses a pair of acoustic transducers 10, 12 located at upstream and downstream positions in a conduit (not shown) where flow is to be measured. A waveform generator 14 when triggered generates a synthesized high frequency burst with a characteristic amplitude envelope having a predetermined frequency, amplitude and shape to fit the application, transducer and receiver. The form of the signal envelope 16 is shown in the drawing to the right of the waveform generator 14. The signal typically rises rapidly in peak-to-peak amplitude to a maximum at the center or midpoint and then rapidly tapers off. The ultrasound frequency within the burst is typically on the order of 500 kHz with an overall duration on the order of 10–100 microseconds. The signal 16 is converted to a powerful driving signal in transmitter 18 and passed via transmit/receive switch 20 or transmit/receive switches 20 and 22 to transducer 10 or 12, respectively, depending on whether upstream or downstream transmission is intended.

The transducer 10 or 12 converts the transmitter signal 16 output to a directional ultrasound burst which moves through the flowing medium to the other one of the transducers 10, 12. The sound energy is converted to an electrical signal which is amplified and filtered in receiver 24 to produce the received signal output 25.

At a rectifying circuit 26 the received signal 25 is rectified to produce the rectified signal 28, shown in FIG. 1. The signal 28 is composed entirely of positive components on a zero base line. The rectified signal 28 passes to a switch 30 which reverses the polarity of the signal at a time determined by the square wave output 32 of a voltage controlled oscillator circuit 34. The rectified envelope is passed via the polarity switch to analog integrator 38.

The integrator output forms the control voltage input to the voltage controlled oscillator circuit 34 which triggers the waveform generator 14. Circuit 34 also synchronously produces the square wave 32 which operates the polarity switch 30 and enables or arms a zero crossing detector 46. Detector 46 produces an output pulse upon the next zero crossing of the unrectified received signal following the half cycle transition point 44 of square wave 32 as shown in FIG. 1.

A set-reset flipflop 48 is set by a timing pulse (C) from the oscillator circuit 34 corresponding, for example, to the midpoint of the transmitted signal envelope and reset by the output of the zero crossing detector 46. The Q output of the flipflop is gated by the clock output of free running oscillator 54 in a pair of AND circuits 50, 52, corresponding to upstream or downstream operation of the flowmeter. The output of each AND circuit forms the clock input to a respective digital counter 56, 58. The output from the counters 56, 58, moreover, may be fed to a microcomputer or other device (not shown) where the transit times may be further processed.

Figure 3:
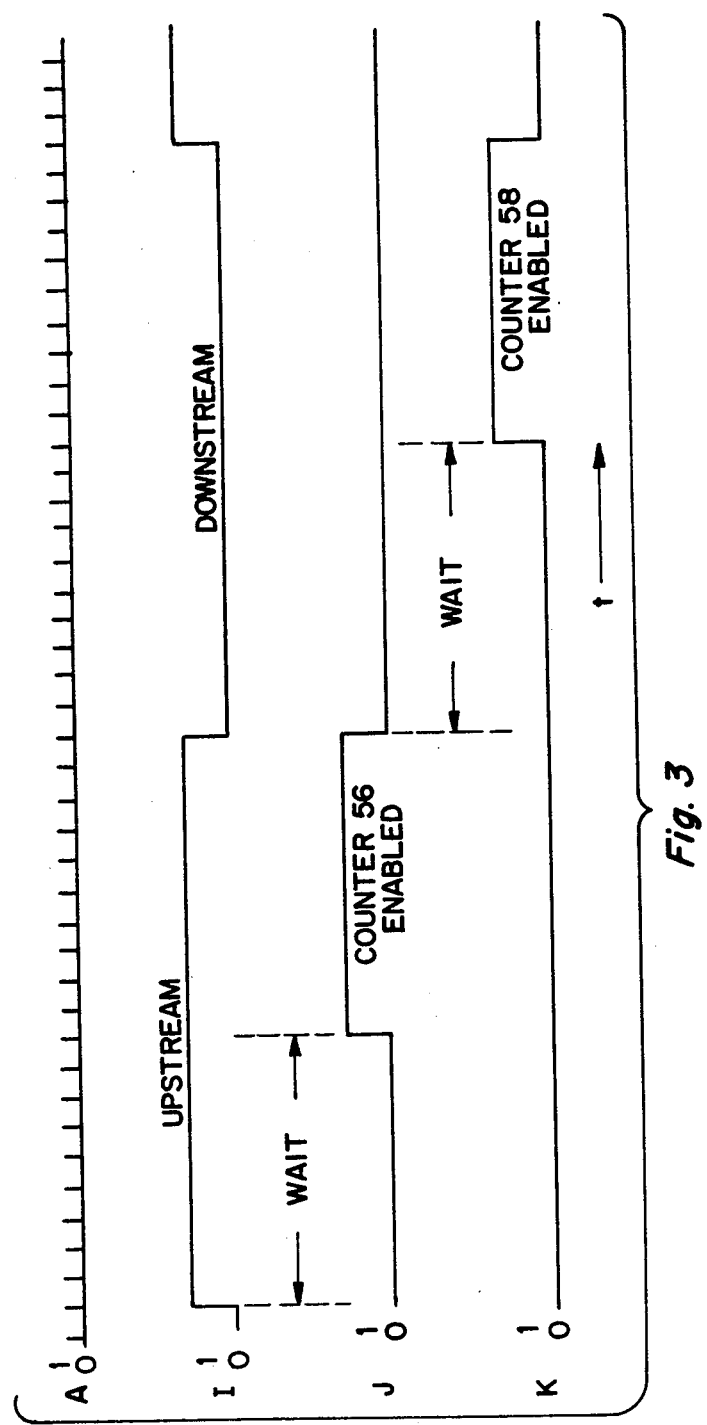

A cycle counter circuit 60 counts trigger signals (A) from the voltage controlled oscillator 34. The counter 60 determines upstream or downstream operation of the flowmeter by interchanging the transmit/receive switches 20, 22 and counters 56 and 58, as shown. As illustrated in FIG. 3, the cycle counter circuit 60 is arranged to allow a given number of repetitions of signal envelopes 16 to obtain frequency lock, or balance, before enabling the appropriate counter 56, 58 through AND circuit 50, 52. Once measurement begins, for example, upstream, the cycle counter 60 continues upstream operation until a preset number of repetitions are averaged. If the counter 56 accumulates the total count from a fixed number of repetitions, the count will be proportional to the average. The cycle counter circuit 60 then switches to downstream operation and repeats the cycle as shown in FIG. 3.

Figure 2:
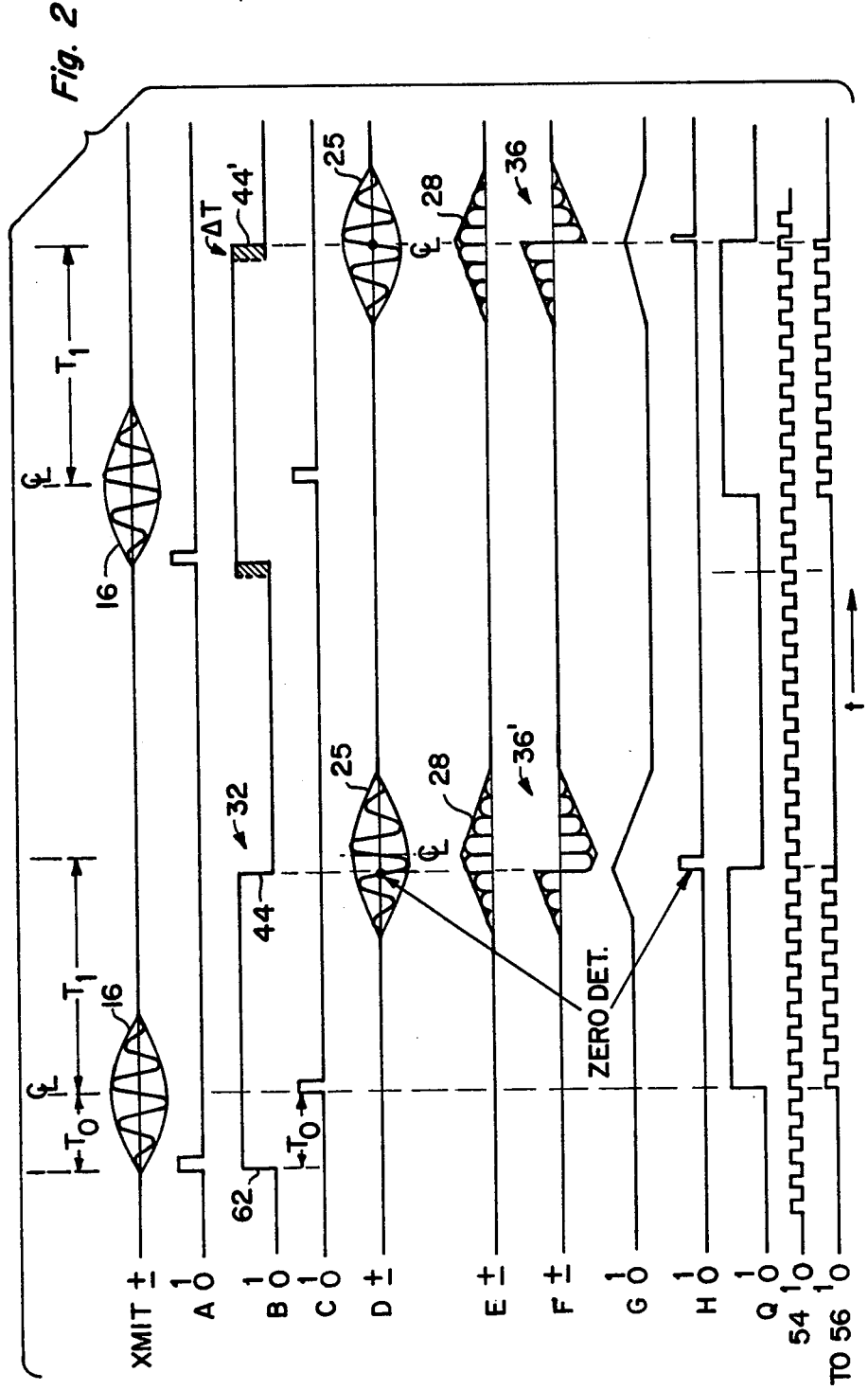
FIGS. 2 and 3 are timing diagrams illustrating the relationship between typical signals in the system of FIG. 1.

In operation, the waveform generator 14 is triggered by pulse A which coincides with the rising (leading) edge 62 of the square wave 32 (signal B of FIG. 2). The ultrasound burst 16 is emitted from the upstream transducer 10. Gauged from the trigger pulse signal A, the midpoint of the envelope 16 always occurs at time $T_0$ coinciding with the set pulse (signal C) from the VCO circuit 34 to flipflop 48. Thus, the Q signal goes high. Meanwhile, the first half cycle of square wave 32 is underway while the burst 16 is travelling through the fluid medium. The received envelope 25 is undergoing rectification as shown in line E when, prematurely, the half cycle transition point 44 reverses the polarity of the input in line F (waveform 36' in line F) before reaching the midpoint of the received envelope. Thus, the resulting integration is unbalanced in the negative direction and the output of the integrator 38 ends up at a lower level after reception of this first burst. In addition, however, the half cycle transition signal enabled the zero crossing detector which produced an output which reset the flipflop 48. Consequently, if counter 56 were enabled, a number of pulses (too few) would be counted by counter 56 in an attempt to measure the interval between the midpoints of the transmitted and received envelopes.

In the second cycle shown in FIG. 2, the error signal output of the integrator 38 on line G has slightly lowered the base frequency of the voltage controlled oscillator circuit 34 thus proportionally lengthening the overall period of the square wave 32 by an amount delta T sufficient to delay the half cycle transition point 44' until approximately the midpoint of the received envelope 25. In this example, the rectified signal 28 is cleaved in two as shown in lines F and G resulting in a balanced integration cycle which leaves the voltage control signal at the same level.

The half cycle transition point is now synchronized with the center of the received envelope. The system having locked onto the midpoint in this example, the correct number of clock pulses are counted by counter 56. Unless the transit time changes, the VCO frequency will remain approximately constant over the ensuing cycles of operation such that the average count will be proportional to the transit time in the forward direction. Since the burst generator trigger pulse A is synchronized to the square wave 32, the pulse repetition period of the bursts 16 is by design twice the average transit time in a given direction.

Using the zero crossing detector circuit 46 instead of the half cycle transition point 44 as the detector output ensures that the system will only detect received signals. Moreover, the zero crossing detector relaxes the requirement of signal detection to the point where the tracking circuit only has to point to the mid cycle in the signal envelope. The zero crossing detector then pinpoints an exact point in the midcycle, namely the zero crossing which always occurs, at least theoretically, at the same time within the envelope itself. Thus the zero detector serves to "fine tune" the measurement reference point.

If desired, the upstream and downstream readings can be subtracted from each other in which case the interval $T_0$ to the midpoint of the transmitted signal can be ignored since it will cancel out in the difference. In this case, the midpoint of the synthesized waveform does not have to be known precisely in advance. In fact, the specific shape of the envelope and amplitude do not have to be known precisely in advance. All that is required for accurate transit time measurements is that the shape or contour of the envelope stay relatively constant over a sufficient number of cycles. Slow amplitude drift or even gradual changes in the contour of the envelope should not make any significant difference.

The system described above uses a very reliable measurement point in the signal envelope 25, namely the zero crossing point of mid cycle of the signal waveform instead of the relatively uncertain and variable peak amplitude. The bandwidth requirements of the system are thus reduced, increasing the signal to noise ratio of the detected signal. Bandwidth requirements of the transducer are also less of a problem with the dynamic tracking system of the invention. Reliability is greatly increased by use of the amplitude-independent adaptive control system of the invention.

Instead of single ended integrator 38, a differential integrator can be used, in which case the rectified signal input is switched to the inverting input of the differential integrator at the half cycle transition point. Alternatively, the integrator 38 can be replaced by other amplifier and low pass filter arrangements known to the art of closed loop feedback design. Any of the analog signal processing steps herein may be converted to digital or vice versa, if desired, for a particular application. In addition, for example, the same counter can be employed for both directions, the output bit of the cycle counter being used to indicate where to store the resulting count.

Other variations of components of the system besides those given in the discussion above may be made without departing from the spirit of the invention. The scope of the invention is set forth in the following claims.

What is claimed is:

1. An acoustic flowmeter comprising
   means responsive to a trigger pulse for transmitting a burst of acoustic energy having a characteristic amplitude envelope along a flow axis of a fluid medium,
   means displaced axially from said transmitting means for receiving said burst,
   means for detecting the envelope of said received burst,
   variable frequency means responsive to an error control signal for generating a periodic output signal indicative of the midpoint of the received envelope,
   means responsive to said received envelope for generating said error control signal indicative of a time interval between said output signal and the actual midpoint of said received envelope,
   said variable frequency means having means for adjusting the frequency of said output signal in a direction to reduce said time interval, whereby said output signal tends to track the midpoint of the envelope of received signals.

2. The flowmeter of claim 1, wherein said variable frequency means also includes means for generating said trigger pulse at the same frequency as said output signal.

3. The flowmeter of claim 2, wherein said trigger pulse period is twice the transit time of said burst.

4. The flowmeter of claim 1, further comprising level detector means enabled by said variable frequency means output signal for producing a detector output upon the next occurrence of a predetermined amplitude level of the received signal.

5. The flowmeter of claim 4, wherein said predetermined amplitude is zero.

6. The flowmeter of claim 5, further comprising timing means for measuring the time interval between transmission of said burst and said detector output to indicate the transit time of the acoustic burst.

7. The flowmeter of claim 6, further comprising transmit/receive switch means interposed between said transmitting means and said receiving means, and
   cycle counter means responsive to a number of consecutive trigger pulses for signalling said switching means to reverse the direction of transmission of said acoustic burst and to provide an output signal indicating the direction of transmission.

8. The flowmeter of claim 7, wherein said cycle counter means further includes means responsive to a predetermined number of trigger pulses for tracking said timing means after a predetermined number of initial transmissions in a given direction, whereby the system is given time to lock onto the midpoint of the received envelope.

9. The flowmeter of claim 1, wherein said error control signal generating means includes
   means for rectifying the received signal,
   integrating means,
   polarity switch means responsive to the variable frequency output signal for passing the output of said rectifying means to said integrating means with uninverted or inverted polarity depending on the condition of the variable frequency output signal, the output of said integrating means forming the error control signal to said variable frequency means.

10. An acoustic flowmeter comprising
    means responsive to a trigger pulse for transmitting a burst of acoustic energy along a flow axis of a fluid medium,
    means displaced axially from said burst transmitting means for receiving said burst,
    means for detecting the amplitude envelope of the received burst, and
    servo control means for tracking the midpoint of the received envelope and for issuing trigger pulses to said burst transmitting means such that the burst repetition period is twice the burst transit time measured to the midpoint of the received envelope.

11. An acoustic flowmeter comprising
    means adapted to be mounted in a fluid medium for receiving an acoustic signal,
    means for detecting the amplitude envelope of the received acoustic signal,
    variable time base means for generating a periodic midpoint test signal, means for comparing the energy level within the envelope before the occurrence of said midpoint test signal with the energy level within the envelope following said midpoint test signal to produce a comparison output, and control means responsive to said comparison output for changing the frequency of said variable time base means in a direction to null said comparison signal.

12. The receiver for claim 11, wherein said comparing means includes means for deriving the difference between said energy levels before and after the midpoint test signal, said comparison signal being a difference signal.

13. An acoustic flowmeter comprising
means adapted to be mounted in a fluid medium for receiving an acoustic pulse signal,
means for determining the midcycle of the received pulse signal,
means for detecting a specific amplitude level within said midcycle irrespective of the overall amplitude of the received signal,
means responsive to detection of said midcycle for determining a signal transit time in said medium, and
means for determining flow rate from said transit time.

14. The flowmeter of claim 13 wherein said specific amplitude level is zero.

15. The flowmeter of claim 13 wherein said midcycle determining means includes servo-control means for tracking the midcycle of said received signal and for issuing a control signal indicative of the occurrence thereof, said level detecting means including means responsive to said control signal for thereafter detecting the next occurrence of said specific signal level.

16. Method for measuring the velocity of flow of a fluid medium comprising the steps of,
transmitting in the downstream direction a first series of bursts, each having a characteristic amplitude envelope, from an ultrasonic transmitter at an angle $\theta$ to a normal to the flow axis of a fluid medium,
detecting the envelope of said bursts at a receiver displaced axially downstream from said transmitter,
measuring the transit time, $T_{down}$, for each of said bursts from a defined point in said envelope at said transmitter to a defined point in the same envelope at said receiver,
transmitting in the upstream direction a second series of bursts, each having a characteristic amplitude envelope, from an ultrasonic transmitter at an angle $\theta$ to a normal to the flow axis of a fluid medium,
detecting the envelope of said bursts at a receiver displaced axially upstream from said transmitter,
measuring the transit time, $T_{up}$, for each of said bursts from a defined point in said envelope at said transmitter to a defined point in the same envelope at said receiver,
computing the flow velocity V from the series of $T_{up}$ and $T_{down}$ measurements,
and whenever a series of upstream or downstream measurements of transit time have a standard deviation greater than a predetermined value, the computed velocity V is not used.

17. Method for measuring the velocity of flow of a fluid medium comprising the steps, of,
transmitting in the downstream direction a first series of bursts, each having a characteristic amplitude envelope at an angle $\theta$ to a normal to the flow axis of said fluid medium,
detecting the envelope of said bursts at a receiver displaced axially downstream from said transmitter,
measuring the transit time, $T_{down}$, for each of said bursts from a defined point in said envelope at said transmitter to a defined point in the same envelope at said receiver,
transmitting in the upstream direction a second series of bursts, each having a characteristic amplitude envelope from an ultrasonic transmitter at an angle $\theta$ to a normal to the flow axis of a fluid medium,
detecting the envelope of said bursts at a receiver displaced axially upstream from said transmitter,
measuring the transit time, $T_{up}$, for each of said bursts from a defined point in said envelope at said transmitter to a defined point in the same envelope at said receiver, and
computing the flow velocity V, according to the equation, $$V_{measured} = \frac{PF}{2 \sin \theta} \times \frac{\overline{T}_{up} - \overline{T}_{down}}{[\overline{T}_{up} + \overline{T}_{down}]^2}$$

where
P = path length of the transmitted ultrasonic bursts from transmitter to receiver,
F = a constant factor
$\overline{T}_{up}$ = the mean $T_{up}$ for the series of burst in the upstream direction
$\overline{T}_{down}$ = the mean $T_{down}$ for the series of burst in the downstream direction,
where whenever a series of upstream or downstream measurements of transit time have a standard deviation greater than a predetermined value, the corresponding V measured is not used.

* * * * *